Dec. 11, 1928.
H. SCHMICK
1,695,031
DETERMINING GASEOUS CARBONIC ACID
Filed July 20, 1926
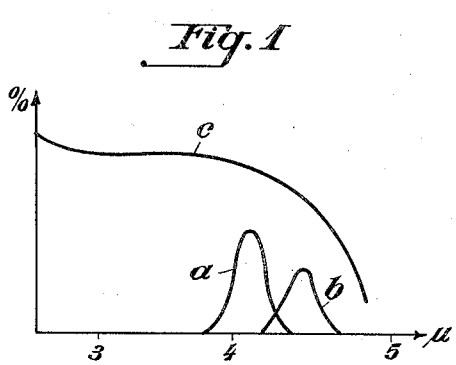
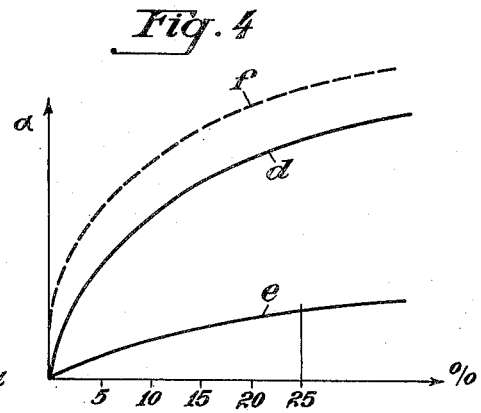
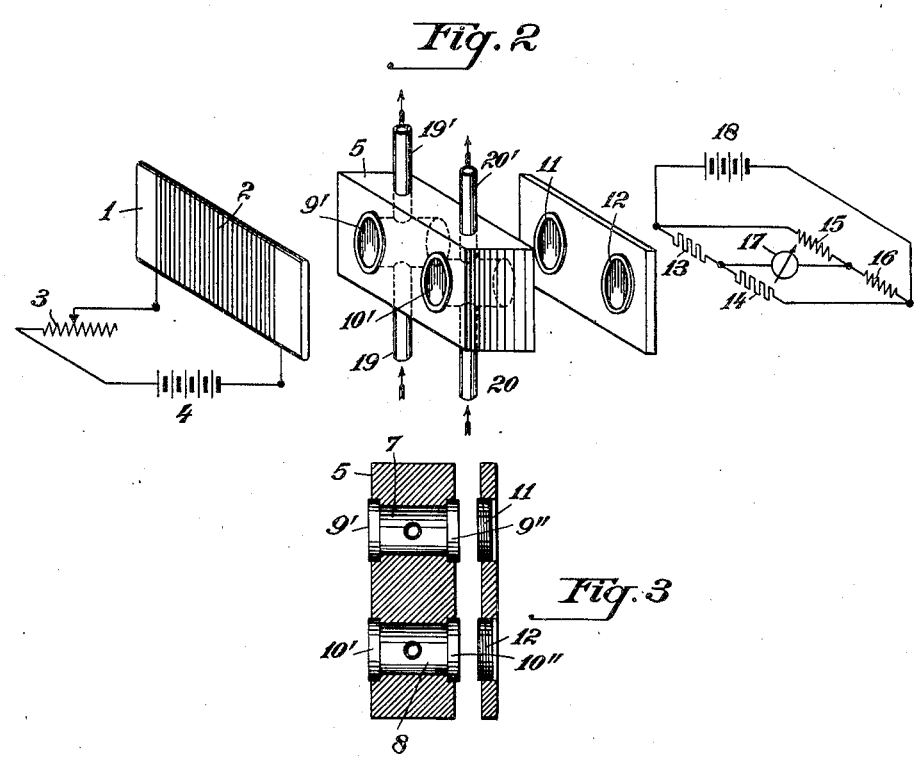
Inventor:
Hans SCHMICK
by
Locka, Kehlenbeck & Farley
Attorneys.

Patented Dec. 11, 1928.

1,695,031

UNITED STATES PATENT OFFICE.

HANS SCHMICK, OF BERLIN-CHARLOTTENBURG, GERMANY, ASSIGNOR TO SIEMENS & HALSKE, AKTIENGESELLSCHAFT, OF SIEMENSSTADT, NEAR BERLIN, GERMANY, A CORPORATION OF GERMANY.

DETERMINING GASEOUS CARBONIC ACID.

Application filed July 20, 1926, Serial No. 123,784, and in Germany September 1, 1925.

The present invention relates to a new and useful method and a suitable device for determining or measuring the contents of gaseous carbonic acid ($CO_2$) in a gas by means of its power of absorption for heat rays.

The determination of the contents of carbonic acid in other gases, such as for instance as an ingredient of the producer gas either necessitates a relatively large set of instruments when chemical absorption processes are employed for the determination, or it is easily liable to disturbances if the determination is to be effected with the assistance of heat conductivity, for in this case the addition of a small quantity of hydrogen influences the heat conductivity as much as does six times the quantity of carbonic acid. It has been further proposed to determine the carbonic acid by means of its heat absorption which is a very high one as compared to that of other gases. As only the total radiation absorption is measured, the presence of other gasses practically constitutes in most cases a source of considerable error. This is more particularly the case when small quantities of carbonic acid are to be determined in a mixture with a relatively large quantity of absorbent gases. As an example may be used the determination of carbonic acid in the producer gas by the comparison of the absorption of the producer gas with that of the air as " comparison gas." Producer gas contains more particularly so much more carbon monoxide than carbonic acid that in spite of the smaller power of absorption of carbon monoxide, the measuring is subject to a considerable error.
This invention relates to a means for rendering this error harmless to such an extent that determinations of absorption for mixtures with a small proportion of carbonic acid shall become practically untilizable. The invention consists in weakening, by means of a suitable absorption medium or substance the portion of the radiation in that range of waves which is chiefly absorbed by the gases—more particularly carbon monoxide—mixed with the carbonic acid, but not by the carbonic acid itself, owing to which the influence of the admixtures on the result of the measurements is reduced and the errors are brought within more narrow practically admissible limits. If it were possible to eliminate all the radiations within the range of the carbon monoxide absorption by means of an absorption medium or substance the contents of carbon monoxide would no longer exercise any influence at all on the result of the measurement. The obvious method, namely that of rendering the admixtures harmless by means of absorbent substances within the range of absorption of which are situated the absorption bands of the admixtures, seems at first not applicable. In the case of the mixture of carbonic acid with carbon monoxide, the most important absorption bands of the two gases somewhat intersect each other, so that it is not possible to eliminate the rays absorbed by the carbon monoxide, by a further absorption substance, and yet to obtain those absorbed by the carbonic acid. In spite of this awkward circumstance, however, it is possible according to the invention to reduce to a sufficient extent the error of measuring by a stronger absorption of the wave lengths of the carbon monoxide band, by employing a special absorption substance the power of absorption of which changes very strongly just in the region in which the most important carbonic acid and carbon monoxide bands partly coincide, this change being in such a direction that the absorption chiefly affects the wave lengths of the carbon monoxide band. This substance is quartz.

In the drawing the object of the invention is shown by the way of example.
Fig. 1 is a diagram of curves.
Fig. 2 illustrates a view of the preferred form of the device.
Fig. 3 shows two parts of Fig. 2 in a sectional view.
Fig. 4 is another diagram of curves.
In Fig. 1 the wave lengths of heat rays are drawn in $\mu$ as abscissæ of a rectangular system of coordinates and as ordinates for the most important band, the absorption of the carbonic acid in the curve $a$, of the carbon monoxide in the curve $b$, and the permeability for quartz in the curve $c$.

It will be seen that starting at about 4.6 $\mu$ the absorption of quartz quickly increases towards the greater wave lengths. Experiments have shown that the radiation which would have been absorbed by the carbon monoxide, is eliminated for the most part by the quartz filter, so that the effect is the same as if the carbon monoxide were present in a correspondingly smaller quantity, and that the remaining action of the carbon monoxide, for conditions that need be considered in practice, fluctuates to such a slight extent that, for the accuracy required, it will be sufficient to take into account the always known average value of the carbon monoxide percentage and to determine from the same the absorption caused by the carbonic acid. The conditions could be imagined to be the following: The amount of the quartz absorption which uniformly affects the radiation quantities absorbed by the carbonic acid and by the carbon monoxide, acts as a magnification of the depth of layer in the gas to be tested, whilst the corresponding influence of the comparison gas is smaller owing to the different distribution of the energy in the absorption spectrum. In as far however as the quartz absorption reduces the absorption in the carbon monoxide more strongly than that in the carbonic acid, it is utilized for reducing the error of measurement. The thickness of the quartz layer must be calculated in such a manner that a sufficient percentual limitation of the error of measurement will be ensured and that on the other hand the radiation energy striking the gas to be tested within the range of the bands in question shall not be weakened too much so as to avoid too severe demands on the sensitiveness of the indicating instrument.

In order to use the relations explained above the arrangement of the apparatus according to the invention may be made for instance as shown in Fig. 2. As a source of radiation a plate 1 of suitable material for instance of porcelain, carrying the heating coil 2 is arranged. The coil 2 is fed over a resistance 3 from a battery 4. The heat rays of the source of radiation affect two bolometric resistances 13 and 14. Between the source of radiation and the two resistances two chambers 7 and 8 filled with two different gases and two quartz filters 11 and 12 preferably of equally strongly acting quantities are placed. The chambers 7, 8 are formed in a solid metallic block 5 and closed at two sides by windows 9′, 9″ and 10′, 10″ of mica or other heat resisting material—see Fig. 3. In the bottom and in the top of each of the two chambers 7 and 8 the open ends of tubes 19, 19′ and 20, 20′ penetrate. Through the tube 19, the chamber 7 and the tube 19′ the gas to be tested which contains the carbonic acid and carbon monoxide is led and through the tubes 20, 20′ and the chamber 8 a comparison gas such as for instance air. The ways of the two gases, which may flow with constant speed, are indicated in Fig. 2 by arrows.

The subject of comparison is the different absorption of the heat rays in the two gases of the two chambers 7 and 8. These two different absorptions cause different temperatures of the two bolometric resistances 13, 14, which are compared with each other by means of an electric measuring arrangement, well known in itself, in such a manner, that a given deflection of the measuring instrument 17 corresponds to a given temperature difference of the resistances 13, 14 and therefore to a given absorption in the chamber 7 for the gas to be tested. In Fig. 2 the bolometric resistances 13, 14 are shown as two sides of a Wheatstone bridge the other sides of which are formed by resistances 15 and 16. The bridge is connected to a battery 18 and the instrument 17 is the ammeter of the bridge. It will be clear to those skilled in the art that the illustrated arrangement of the Wheatstone bridge may, as is well known, be changed in various ways without departing from the spirit of the invention.

It is, however, of great importance to use in the measuring device described the quartz filters 11, 12, of which Fig. 3 shows a sectional view. They must be arranged in any suitable manner between the source of radiation 1, 2 and the bolometric resistances 13, 14 within the range of the heat rays which pass through the two gases. If desired, the filter 12 in the beam of rays of the comparison gas may be dispensed with.

In order to explain the action of the quartz filter and the method of application of the new device, Fig. 4 reproduces diagrammatically the absorption curves $d$ of carbonic acid and $e$ of carbon monoxide when using a quartz filter in the manner described. These curves are to be determined by experiments. The percentages of the gases are shown as abscissæ and the deflections of the galvanometer as ordinates.

The measurement determines the value of the total absorption for carbonic acid, carbon monoxide and other ingredients, which in the case of constant proportion of carbon monoxide and fluctuating carbonic acid proportion, would be represented by a curve $f$ equidistant from the curve $d$. A known average value of the carbon monoxide proportion can be however relied upon, as the fluctuations of the carbon monoxide proportion no longer give any inadmissible errors when the invention is applied, as already stated.

Let it be assumed for instance that the average proportion of carbon monoxide is 25%. Then the ordinate of the carbon monoxide absorption curve $e$ belonging to the abscissa 25, would generally have to be deducted from the deflection corresponding to the total absorption, in order to obtain the ordinate of the carbonic acid curve, from which would then be determined the value sought as abscissa. For the sake of simplicity, it has been assumed that there is proportionality between deflection and absorption. If, however, as will be mostly the case, the same percentage of carbon monoxide as average value need be reckoned with only one single curve $d$ of the measured value will have to be considered.

What I claim as my invention and desire to secure by Letters Patent is:—

1. A device for determining gaseous carbonic acid comprising in combination a receiver of radiation, a source of radiation adapted to act upon said receiver, means for holding a gas containing carbonic acid, a quartz filter, both said gas holder and said filter arranged in the range of rays between said source and said receiver, and means for determining the action of heat rays at said receiver.

2. A device for determining gaseous carbonic acid comprising in combination a receiver of heat radiation, a source of heat radiation adapted to act upon said receiver, a first means for holding gas containing carbonic acid and carbon monoxide, a second holding means for a comparison gas, both said first and said second means being in the range of heat rays between said source and said receiver, a quartz filter for filtering the rays of said first gas, and means for comparing the actions of the beams of rays of said first and second gas at said receiver.

3. A device for determining gaseous carbonic acid comprising in combination a receiver of heat radiation, a source of heat radiation adapted to act upon said receiver, a first means for holding gas containing carbonic acid and carbon monoxide, a second holding means for a comparison gas, both said first and said second means being in the range of heat rays between said source and said receiver, a quartz filter for filtering the rays of said first gas, another quartz filter for filtering the rays of said second gas, and means for comparing the influence of the beams of rays of said first and said second gas at said receiver.

4. A device for determining gaseous carbonic acid comprising in combination an electrical receiver of heat radiation, a source of heat radiation adapted to act upon said electrical receiver, a first means for holding gas containing carbonic acid and carbon monoxide, a second holding means for a comparison gas, both said first and said second means being in the range of heat rays between said source and said receiver, a quartz filter for filtering the rays of said first gas, and an instrument for measuring the change of current intensity caused at said electrical receiver by the comparative actions of the beams of rays of said first and second gas.

5. A device for determining gaseous carbonic acid comprising in combination a bolometric resistance, a source of heat radiation adapted to act upon said resistance, means for holding a quantity of gas containing carbonic acid and carbon monoxide, a quartz filter, both said gas holder and said quartz filter arranged as absorbing means in the range of radiation between said source and said resistance, an electrical measuring instrument, and circuit connections between said resistance and said instrument.

6. A device for determining gaseous carbonic acid comprising in combination, a first bolometer resistance, a second bolometer resistance, a source of radiation electrically heated for acting upon said first and second bolometric resistance, means for holding a gas containing carbonic acid and carbon monoxide, a first quartz filter, both said gas and said first quartz filter inserted as absorbing means in the beam of rays between said source and said first bolometric resistance, means for holding a quantity of air, a second quartz filter, both said air holding means and said second quartz filter arranged as absorbing means in the range of radiation between said source and said second bolometric resistance, said first and said second bolometric resistance forming parts of a Wheatstone bridge arrangement, the galvanometer of which determines the percentage of carbonic acid in said first gas.

7. The method of determining carbonic acid comprising in combination leading heat rays from a source of radiation through a gas containing carbonic acid and carbon monoxide to a receiver sensitive for radiation and inserting a quartz filter in the range of rays.

In testimony whereof I affix my signature.

HANS SCHMICK.